(12) United States Patent
Alon et al.

(10) Patent No.: US 7,548,189 B2
(45) Date of Patent: Jun. 16, 2009

(54) USING RADAR TARGETS OF OPPORTUNITY TO BUILD A MONOPULSE CALIBRATION TABLE

(75) Inventors: Yair Alon, Thousand Oaks, CA (US); Mark Jacobs, Simi Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 298 days.

(21) Appl. No.: 11/507,332

(22) Filed: Aug. 21, 2006

(65) Prior Publication Data

US 2008/0042896 A1    Feb. 21, 2008

(51) Int. Cl.
*G01S 7/40* (2006.01)
*G01S 13/44* (2006.01)

(52) U.S. Cl. .................... 342/174; 342/149; 342/152

(58) Field of Classification Search ............. 342/174, 342/25 C, 149–154, 427
See application file for complete search history.

(56) References Cited

U.S. PATENT DOCUMENTS

| | | | | |
|---|---|---|---|---|
| 4,994,810 A | * | 2/1991 | Sinsky | 342/151 |
| 5,241,317 A | * | 8/1993 | Howard | 342/149 |
| 5,977,906 A | * | 11/1999 | Ameen et al. | 342/174 |
| 6,819,285 B1 | * | 11/2004 | Stockman et al. | 342/123 |
| 6,853,330 B1 | * | 2/2005 | Krikorian et al. | 342/149 |
| 7,183,969 B2 | * | 2/2007 | Pozgay et al. | 342/174 |
| 7,250,902 B2 | * | 7/2007 | Manoogian et al. | 342/154 |
| 2008/0012765 A1 | * | 1/2008 | Xu et al. | 342/442 |

OTHER PUBLICATIONS

Jacovitti G et al.: "Self-Calibrating SSR Monopulse Receiver", IEEE Transactions on Aerospace and Electronic Systems USA, Oct. 4, 1992; pp. 944-949; vol. 28, No. 4.

* cited by examiner

*Primary Examiner*—Thomas H Tarcza
*Assistant Examiner*—Cassi Galt
(74) *Attorney, Agent, or Firm*—Patti, Hewitt & Arezina LLC (57) ABSTRACT

In a radar system, a monopulse calibration table is constructed from live targets of opportunity. A center of gravity or weighted average of normalized signals ΔV received at SUM and DIFF channels from a live target are used to determine the target's actual azimuth. Off bore sight angles (OBA) of the target are then determined from the target's actual azimuth. Normalized received signal values of ΔV are converted to nearest-valued integers. The OBA s that correspond to each integer-valued normalized received signal are averaged and can then be plotted as a function of normalized received signal value ΔV. Different tables or plots can be constructed for elevation angles. An equation of a best-fit line the matches or at least closely approximates the plotted data is determined to smooth the actual data.

48 Claims, 7 Drawing Sheets

USING RADAR TARGETS OF OPPORTUNITY TO BUILD A MONOPULSE CALIBRATION TABLE

TECHNICAL FIELD

This invention relates generally to radar systems and in particular to radar calibration, and is more particularly directed toward constructing a calibration table for an azimuth-scanning or elevation-scanning radar system utilizing real targets of opportunity.

BACKGROUND

In a radar system, the azimuth location of an object in space can be determined in part by where a radio signal from the target originates from, relative to where the antenna is pointing. The location of an object can be determined by detecting a signal emitted from or reflected from an object and, by where the radar antenna is pointed, when a signal from the target is detected.

When a radar antenna's center line or boresight is pointed in a particular direction, the direction of where the antenna boresight is pointed and true north forms an angle commonly referred to as the antenna's azimuth angle or simply "azimuth." Thus, a target can be located in part by using both a signal detected from the target and the antenna's (or the target's) azimuth angle as recorded by the antenna azimuth sensor (shaft encoder, synchro and others).

A problem with radar antennas is that a radar antenna has a finite beam width of $\theta_B$ and the accuracy of a target's measured azimuth is affected by this beam width. The target is detected within $+/-0.5\ \theta_B$ degrees of the antenna's boresight resulting in an azimuth target position uncertainty of about $\theta_B$. In order to better define the target position in space a technique known as monopulse is used. This technique measures at any instance, the target off bore sight azimuth (OBA) and, by combining this value with the current antenna boresight position, the target's azimuth in space can be determined.

The monopulse techniques use radar antenna signals from an object using two antennas or channels, which are commonly referred to as SUM and DIFFERENCE (or "DIFF") channels, as is known in the art. When a target is detected by the antenna, signals from both the SUM and DIFF channels are received. The SUM channel signal is maximum when the target is at the boresight and reduced as the target is off boresight. The DIFF channel signal is minimum when the target is at the boresight and increased when target is off boresight. By comparing the level or amplitude of the SUM and DIFF signals, a target's position in the beam can be accurately defined as a fraction of the antenna beamwidth $\theta_B$. The beamside direction is measured from the phase difference between the SUM and the DIFF channel. This phase is changed by 180 degrees from one side of the antenna boresight to the other.

Although a target's general location can be established from the SUM and DIFF signals when a target is in the antenna's beam, a problem exists because the SUM and DIFF signal level are affected by the specific antenna pattern, the target signal strength, and the receiver gain of the two channels. Thus, a calibration table is required in order to convert the signal levels received from the SUM and DIFF channels to actual normalized target azimuth angles. This table converts each reading to an actual measurement angle.

The calibration function that converts signal levels from a target to an actual target azimuth is the basis of the monopulse azimuth measurement. First, the monopulse signal has to be normalized to produce a signal that is only angle related (eliminating the effects of target signal level). Since both the DIFF and the SUM are equally affected by the target signal, the ratio of DIFF to SUM is a normalized value not affected by the signal level. The normalization process can be DIFF to SUM, SUM to DIFF or any arithmetic subtraction of the logarithmic presentation of the signal. Once the signal level measurement is normalized, it is necessary to convert a normalized signal level to an OBA azimuth using a calibration table that corrects for antenna patterns, receiver gain mismatch, cable losses and any other errors that may effect the monopulse conversion process.

In the prior art, a specially identified target at a known location (sometimes referred to as a PARROT) is used for the calibration process. When the antenna passes such a target, it uses the antenna boresight reading and the precisely known radar and target locations to calculate the azimuth difference between the antenna boresight and the known location of the target. This is used to generate a calibration table where each monopulse reading is associated with a target OBA reading. However, such a process has limitations.

The target, which is sometimes referred to as a PARROT, may not be available or may not be operational at a specific site. There is often cross coupling between the calibration table generation and azimuth registration processes that may result in a shifted calibration table.

Accurate PARROT and radar position are also important. Any error in the PARROT's location, the radar location or in the antenna's boresight positioning can result in an inaccurate calibration table.

In the prior art, the table is also generated only for one antenna elevation angle (the elevation angle of the PARROT). Since it is known that antenna monopulse behavior is affected by the antenna elevation angle, the data is not accurate for all other elevation angles. Since only a single target is used to generate a calibration table, the process is lengthy and it is likely that not all table entries will have data samples.

A method and apparatus to generate a calibration table which overcomes the prior art method limitations would be an improvement over the prior art.

SUMMARY

The method of creating a monopulse calibration table using radar targets of opportunity first involves normalizing signals received from a live "target of opportunity" at the SUM and DIFF channels. For each antenna scan, all the "normalized" signals obtained for a specific target for all azimuths are tabulated (monopulse normalized signal versus antenna bore-sight reading). Once a target end is achieved (i.e., the antenna passed the target location), the target center angle $\theta$ is calculated. The target center angle $\theta$ is, in general, the angle where the normalized signal is maximal. However, to better determine that center angle, a "center of gravity" of the normalized signals is determined.

After the azimuth center angle of the target is determined, the difference between the target's actual azimuth center angle and every other azimuth angle as recorded for this target, is determined. These off boresight angles and their corresponding normalized SUM/DIFF values are stored in an array or table thereby forming a monopulse calibration table. This table is organized as L records (typical value 512), each record index being a specific normalized SUM/DIFF reading (or any other normalized values that can be used to offset the signal level). The contents of each record is the off boresight angle as determined above, associated with a corresponding normalized SUM/DIFF (or any other normalized value) reading.

Since each target of opportunity provides a relatively small, finite number of readings (typically 10 to 50), data from each live target will populate only a fraction of a calibration table of say numerous entries. In a typical setting, the normalized monopulse reading can have integer values ranging from 0 to say 256. Since data is recorded for both sides of the beam, a total of 512 records are available for this case. The beam side is determined by the SUM to DIFF phase measurement for each record, with each record index being a specific normalized SUM/DIFF reading.

In order to populate the table, readings are obtained from additional targets as they are detected. In a single 360 degrees antenna scan where there are K targets, each target providing N readings, a total of K*N table entries will be updated in a single scan. Some of the readings for a target may be for new table locations and some may be to already populated table locations.

As the process continues, it is likely that a single table record will have multiple entries. To improve the table accuracy, a running average of all the OBA values is calculated for each record. As more OBA data is acquired, the table accuracy is improved and the OBA in each record provides an increasingly accurate representation of the actual OBA for that record.

Even in a very dense target environment, it is possible that some records will have poor data. This may be related to the fact that some records did not get enough entries or that the data at a specific record was received from a noisy target. In order to further improve the calibration table accuracy, a least square third order polynomial is calculated in order to fit the data or "smooth" the table in order to provide a better prediction of the normalized monopulse reading for each record. The final calibration table is a linear combination of the best-fit line and the measured data. Records with W entries (typical 50) are used as they are while records with lower entries are replaced by the best-fit line.

In order to compensate for antenna elevation distortions (known as elevation beam widening), several tables (typically 5), each for a different range of elevation angles, are calculated. The target elevation angle is derived from the "identify friend or foe" (IFF) mode C or from 3-D radar height measurement and is used to assign data to the proper elevation angle table.

Since most of the targets are at lower elevation angle (where the first table is built), this table, known as the default table, is used in place of the other tables while they are still in the process of being built. Once a table is done, it is used for it's specific range of elevation angles.

The horizontal scanning process outlined above can be applied to vertical scanning as well.

DETAILED DESCRIPTION

Figure 1:
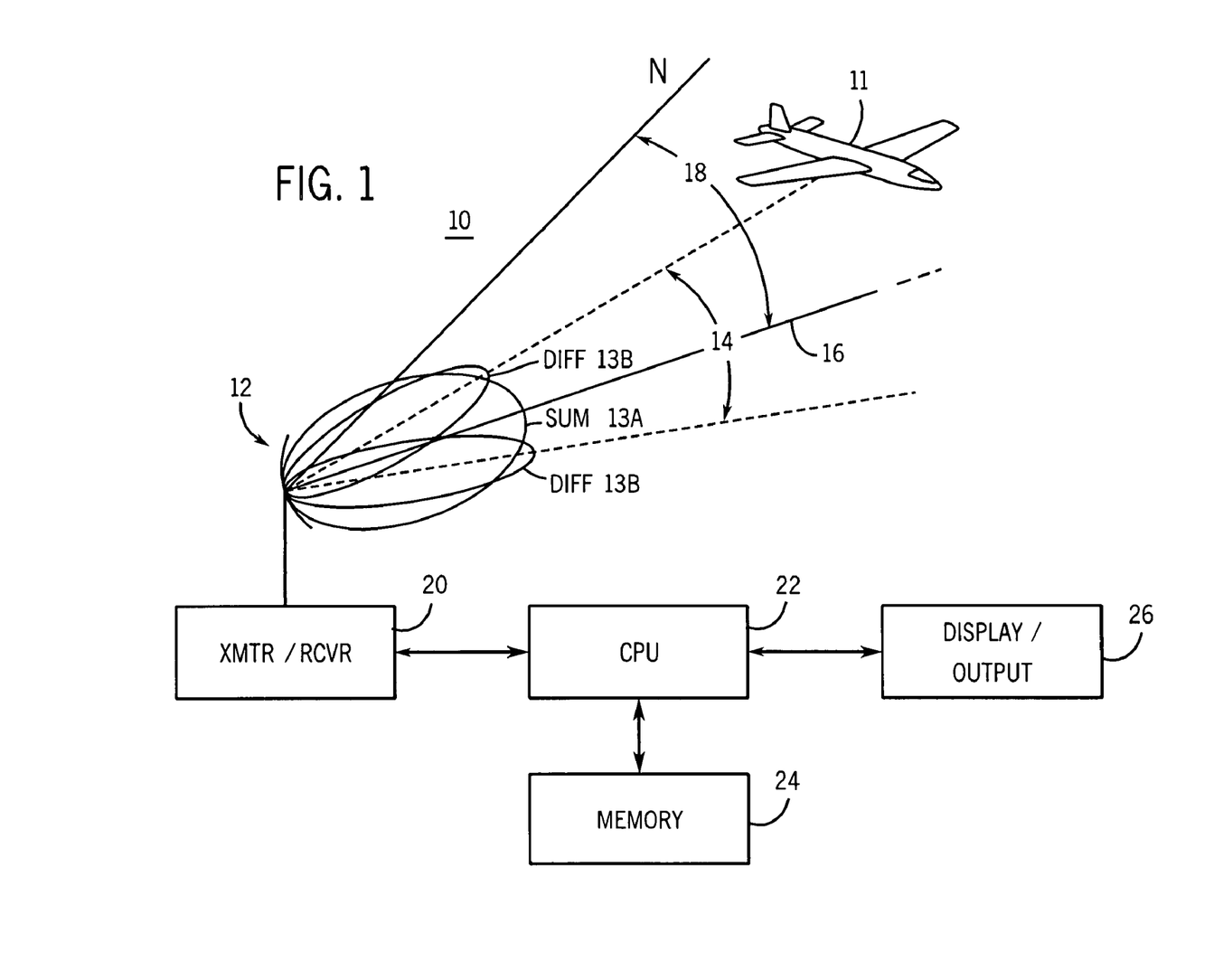
FIG. 1 is a diagram of a radar system and a target of opportunity.

FIG. 1 is a depiction of a radar system 10 comprised of a rotating antenna 12 having two input channels or input patterns known in the art as the SUM 13A channel and a DIFFERENCE or DIFF channel 13B. The antenna 12 has a beam width 14, the center line or bore sight of which is identified by reference numeral 16. As the antenna 12 rotates about a vertical axis, the bore sight 16 and a reference direction such as true north form an angle 18 referred to herein as azimuth. In one embodiment using SSR, the target of opportunity 11 has a transponder that emits a signal when the transponder detects a signal from a radar transmitter. When SSR is used, the radar signal returned by the target surface is used for the monopulse process. For each signal or pulse that the transmitter 20 emits at a given azimuth angle $\theta$, the transponder in the target 11 emits a response signal or the target's surface returns the signal. Thus, there are SUM and DIFF signals produced at each of several different azimuth angles $\theta$.

Figure 2:
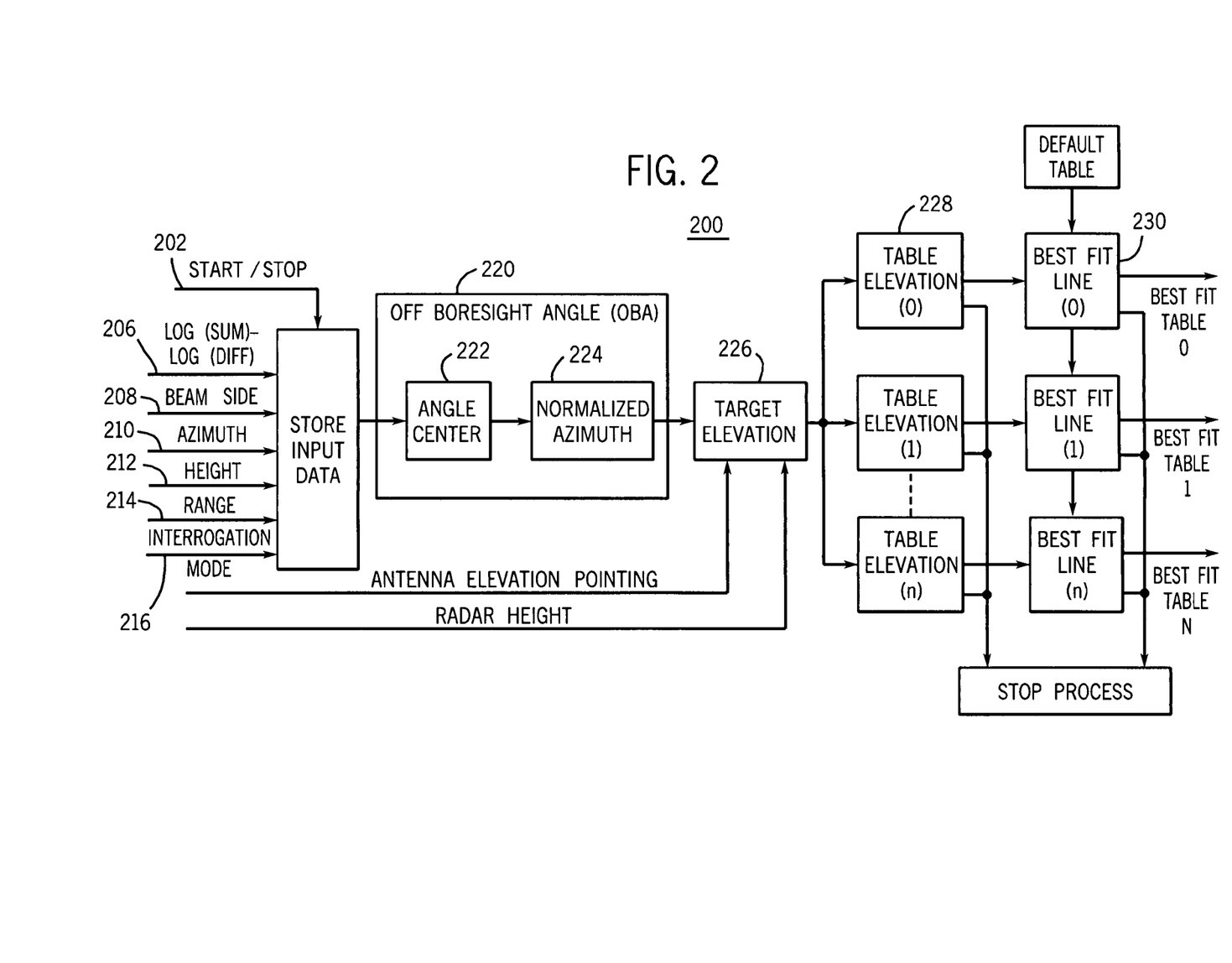
FIG. 2 is a chart showing the entire process of generating the calibration table which includes determining a target's off-bore sight location from the strength of signals received at SUM and DIFF antennas of the antenna, the calculation of the table, storing the tables in the arrays, calculating the best fit line and building the final calibration table.

FIG. 2 shows a chart that depicts the steps of the general method 200 of building a monopulse calibration table using a radar target of opportunity 11 with a radar system or radar receiver, such as the system and receiver shown in FIG. 1. FIG. 2 also shows the signals used by the method.

In a first step that is identified in FIG. 2 by reference numeral 202, monopulse data is collected from a target and stored in a computer memory device, such as random access memory (RAM) or magnetic or optical disc. A computer memory storage device is identified in FIG. 1 by reference numeral 24. The collected data for each of several azimuth angles $\theta$ provides a monopulse estimate, which is depicted in FIG. 2 by reference numeral 206. The monopulse estimate is defined as:

$$\Delta V = \text{Log(SUM)} - \text{Log(DIFF)} \quad (1)$$

where SUM and DIFF are the amplitudes of the signals received at the sum and difference channels of an antenna respectively.

In addition to storing a monopulse estimate, a beam side indication is also stored. The beam side indication and its storage is identified in FIG. 2 by reference numeral 208.

The antenna's azimuth angle $\theta$ is stored, the value and storage of which is identified in FIG. 2 by reference numeral 210. The antenna's azimuth angle $\theta$ is the angle of the antenna where the SUM and DIFF signals used in the monopulse estimate were obtained.

If it is available, the target's height is stored. In FIG. 2, the target's height and its storage is identified by reference numeral 212.

The target's range is stored, which is identified by reference numeral 214 and the radar's interrogation mode is also stored, which is identified by reference numeral 216.

In a second step of the method of building a monopulse calibration table from a live target, the target's actual location azimuth is determined and the azimuth readings obtained from a target are normalized. The azimuth angle readings from a target are normalized by subtracting the actual azimuth angle from the azimuth readings where the sum and diff signals were obtained. In FIG. 2, the process of determining off bore sight angles of a live target is identified by reference numeral 220. The sub-process of determining a live target's actual azimuth or angle center is identified by reference numeral 222 and the process of normalizing other off bore sight azimuth angles θ is identified by reference numeral 224.

In building a monopulse calibration table from a live target, the target in one example is swept several times. After the last sweep, the data that was collected in the step identified by reference numeral 202 is first used to calculate the target's azimuth center, which is labeled "angle center" in FIG. 2. The calculation of a target's actual azimuth angle $\theta_{boresight}$ or "angle center" in FIG. 2 can be determined two ways.

In a simple case where the SUM and DIFF signals from a target are strong and the beam side indicator (embodied as a DIFF signal phase change) is unambiguous, a target's actual azimuth angle $\theta_{boresight}$ (identified as the angle center in FIG. 2) can be determined by first computing ΔV for each of several different azimuth angles θ using equation (1) above. As a second step of the process 222 of determining a target's actual azimuth or angle center, the values of ΔV for each azimuth angle are compared to each other. The azimuth angle θ where ΔV is maximum is considered to be the azimuth angle $\theta_{boresight}$ where the target is actually located.

Figure 3:
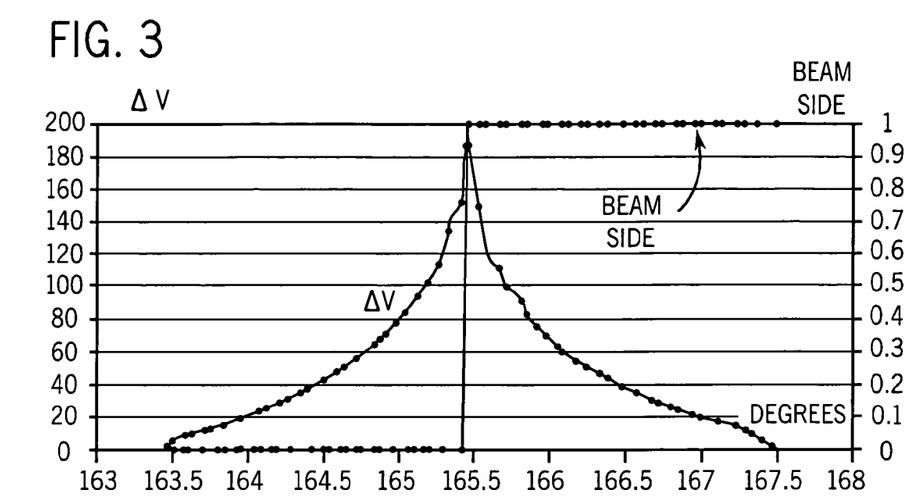
FIG. 3 is a graph of data obtained from an actual target having strong SUM and DIFF channel signals.

FIG. 3 is a graph of ΔV signals at various azimuth angles that were obtained from an actual live target having strong SUM and DIFF channel signals. As can be seen in FIG. 3, there is a distinct maximum ΔV at an azimuth angle of approximately 165.5 degrees (for the specific target represented in FIG. 3), which is also where the DIFF signal phase angle or beam side indicator (identified by reference numeral 208 in FIG. 2) changes from one to zero, indicating a 180 degree phase change. Once the target's actual azimuth angle $\theta_{boresight}$ is determined, the other values of ΔV for the target can be correlated to the azimuth angles where every other ΔV was calculated. The other values of ΔV are correlated to corresponding off bore sight angles by calculating the arithmetic difference between $\theta_{boresight}$ and the azimuth angle θ where every other ΔV was determined. By plotting the value of ΔV obtained at $\theta_{boresight}$ and plotting the values of ΔV obtained at several other OBA as a function of OBA, a simple monopulse calibration table of ΔV values vs. off bore sight angles (OBAs) can be constructed from signals received from (or returned by) an actual target.

Figure 4:
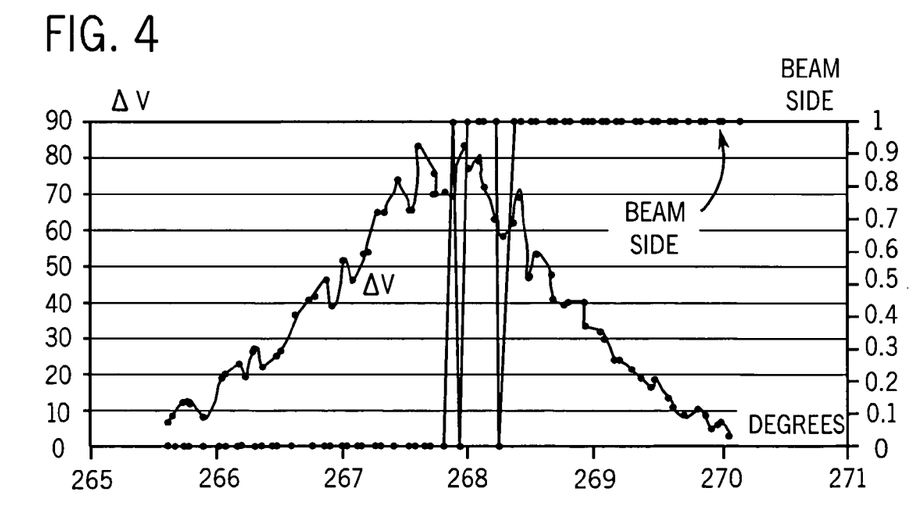
FIG. 4 is a graph of data obtained from an actual target having weak SUM and DIFF channel signals.

In a radar system where the SUM and DIFF channels are strong, the above-identified simple process of determining an azimuth angle where ΔV is maximum can work effectively as will the above-identified process of determining normalized azimuth values. FIG. 4, however, is a graph of ΔV signals at various azimuth angles that were obtained from an actual target having weak SUM and DIFF channel signals. As shown in FIG. 4, when signals from a target are weak, the graph of ΔV as a function of off bore sight azimuth angles θ can have many ΔV that can each appear to be maxima. Moreover, there may be more than one azimuth angle where the DIFF signal phase change is not distinct, as shown by the multiple beam side indicator transitions.

Figure 5:
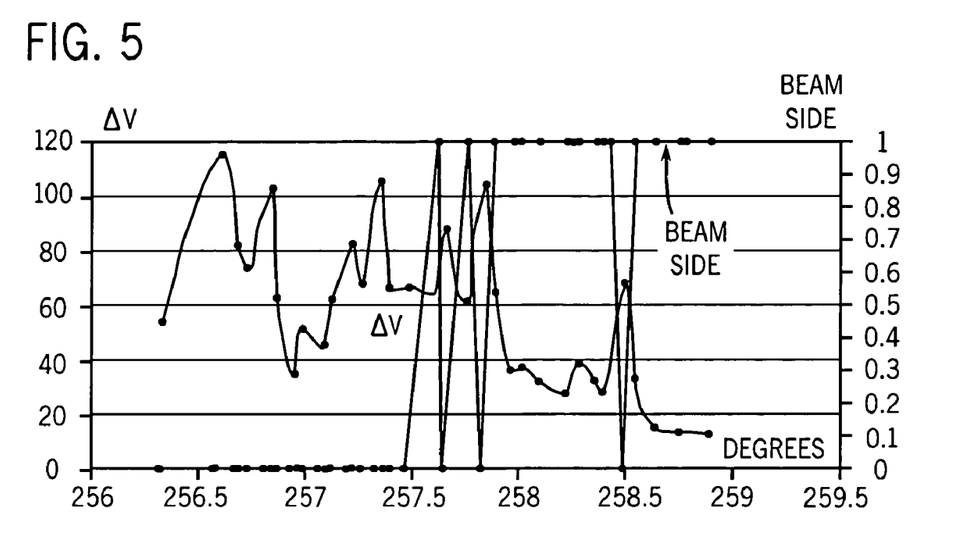
FIG. 5 is a graph of data obtained from an actual target having noisy SUM and DIFF channel signals that may result from interference.

FIG. 5 shows a graph of actual ΔV signals at various azimuth angles calculated from a garbled or noisy target. As shown in FIG. 5, there does not appear to be any maxima of ΔV at any particular azimuth angle θ.

Together, FIGS. 3, 4 and 5 show that a single set of SUM and DIFF signals might not show an azimuth angle of where a target is actually located. Thus, in one embodiment, finding the target boresight using an actual target of opportunity uses weighted averages of ΔV throughout an entire beam width scan, using several ΔV signal levels at several azimuth angles. In such an embodiment, the process of determining the actual azimuth angle $\theta_{boresight}$ of an actual target (identified by reference numeral 222 in FIG. 2) is determined using a weighted average of all i azimuth angles and corresponding ΔV values. The weighted average value of $\theta_{boresight}$ in this embodiment is expressed as:

$$\theta_{boresight} = \frac{\sum_i \theta_i \Delta V_i}{\sum_i \Delta V_i} \qquad (2)$$

where $\theta_i$ is an azimuth angle where a corresponding ΔVi is determined using equation (1) above.

$\theta_{boresight}$ is more reliably determined using a weighted average of several azimuth angles θ and the corresponding ΔV. After $\theta_{boresight}$ is determined, OBA azimuth readings can be determined for the other azimuth angles where ΔV was determined by subtracting $\theta_{boresight}$ from the azimuth angle where each ΔV was determined from equation (1) above.

Figure 6A:
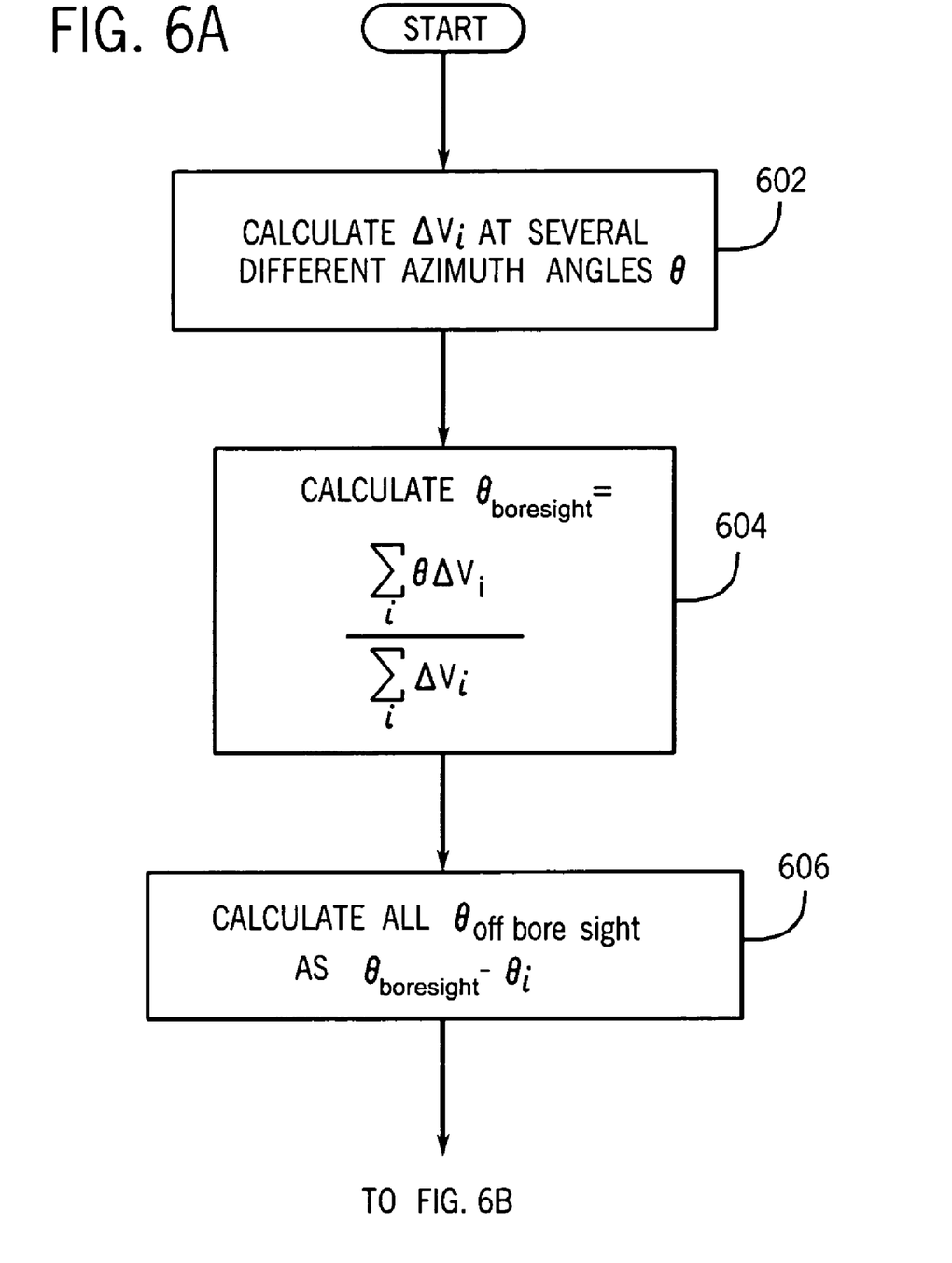
FIG. 6 is block diagram showing steps of another embodiment of the method disclosed herein.
Figure 6B:
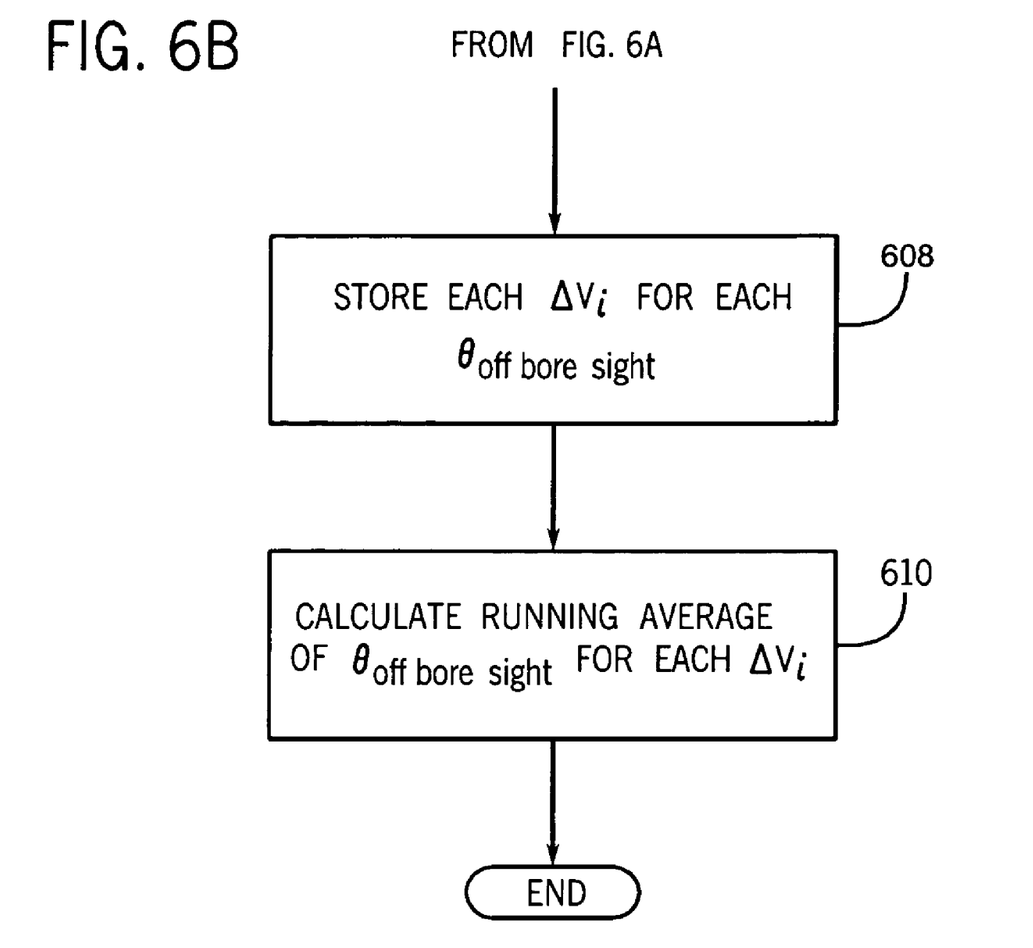
Figure 7:
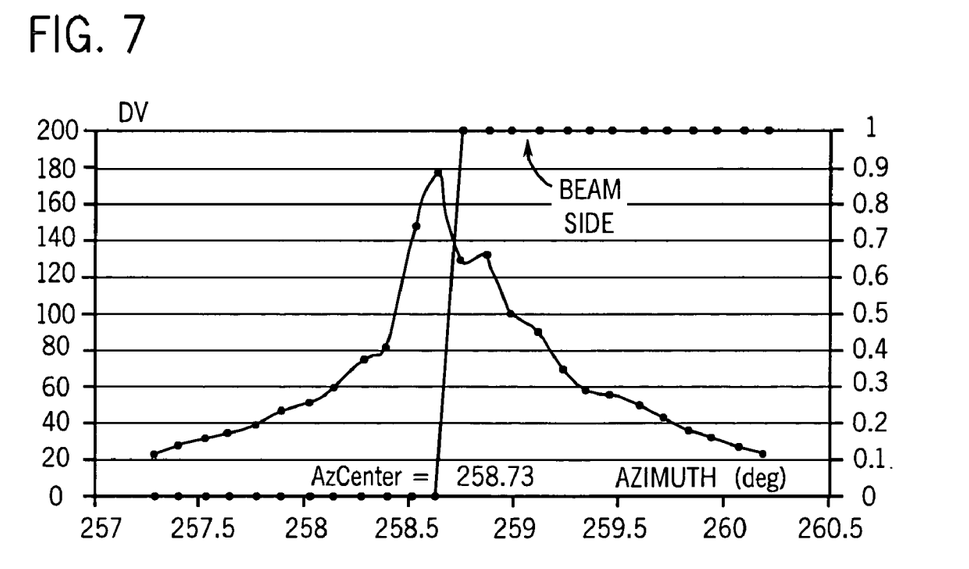
FIG. 7 is a graph of an actual calibration table measured data and best fit line superimposed on it calibration table (one out of 5 used) where the calibration angle is plotted as a function of the monopulse discriminant.

FIG. 6 (FIGS. 6A and 6B) shows steps of a method for constructing a monopulse calibration table from ΔV signals received from several targets of opportunity at a single elevation angle, which can of course be repeated for targets at different elevation angles.

At step 602, a normalized received signal ΔVi is calculated for signals that are received at the antenna's SUM and DIFF channels from a target at each azimuth angle $\theta_i$ of several different i azimuth angles. At step 604, the target's actual azimuth angle $\theta_{boresight}$ is calculated as the sum of the product of all $\theta_i \cdot \Delta V_i$, where $\theta_i$ is the azimuth angle where a particular $\Delta V_i$ is determined, divided by the sum of all $\Delta V_i$.

In step 606, for each of the i-number of azimuth angles θ where a $\Delta V_i$ is determined, the off bore sight angle $\theta_{off\ bore\ sight}$ where each $\Delta V_i$ was determined is calculated as the arithmetic difference between each azimuth angle $\theta_i$, of the first step and the azimuth angle $\theta_{boresight}$ determined in the second step to obtain i, off-bore sight angles, $\theta_{off\ bore\ sight\ i}$, whereat each of the normalized signals $\Delta V_i$ of step a) was determined. The normalized received signals $\Delta V_i$ obtained in the first step are correlated to corresponding off-bore sight angles (OBA) expressed as $\theta_{off\ bore\ sight}$. In step 608, the values of $\Delta V_i$ determined at each off bore sight angle are stored and in step 610, a running average of each the off bore sight angles for each $\Delta V_i$ is calculated.

As can be seen in from Eq. (2) above, when determining $\theta_{boresight}$ using a weighted average, many azimuth angles are included in the determination of $\theta_{boresight}$ during which, some readings may cross North or be detected as having crossed North because of the antenna beam width. Therefore, when determining $\theta_{boresight}$ using a weighted average, a test is first made to determine if a reading crossed North.

The determination of whether a reading or readings crossed North during the collection of azimuth angle measurements is made by determining whether the arithmetic difference between the last azimuth angle collected (expressed as $\theta_{end}$) and the first azimuth angle collected (expressed as $\theta_{start}$) is less than zero. This test can be expressed as:

IF($\theta_{end} - \theta_{start}$) < 0 then
   target_North_crossing == true;

If the readings crossed North during the collection of azimuth angles, 360 degrees is added to any azimuth angle value measured to be less than 180 degrees, when determining the weighted average of $\theta_{boresight}$. This test of azimuth angles and the adjustment to measured azimuth angles θ less than 180 degrees when the readings crossed North can be stated as:

IF(target_North_crossing == true && $\theta_i$ < 180)
   then $\theta_i = \theta_i + 360$;

If the azimuth center $\theta_{boresight}$ as determined by using equation (2) above is calculated to be greater than 360 degrees, then 360 degrees needs to be subtracted from the calculated $\theta_{boresight}$. This step can be stated as:

IF($\theta_{boresight}$ > 360)
   then $\theta_{boresight} = \theta_{boresight} - 360$;

After the azimuth angles and normalized received signals are accumulated, and after $\theta_{boresight}$ is determined, a table or graph of the normalized received signal values and an average of corresponding off bore sight azimuth angles can be created for each normalized received signal ΔV. Each OBA azimuth angle $\theta_i$ to be entered into the table is determined from the expression:

$$\theta_{off\,boresight} = \theta_{boresight} - \theta_i \quad (3)$$

with values on the right side of the beam being assigned a positive value and values on the left side of the beam being assigned a negative value. For a reading crossing North, a correction is applied, the value of which is determined by whether $\theta_i$ is greater than 180 degrees or less than −180 degrees. The correction is expressed as:

If ($\theta_{off\,boresight}$ > 180); $\theta_{off\,boresight} = \theta_{off\,boresight} - 360$; and
If ($\theta_{off\,boresight}$ < −180); $\theta_{off\,boresight} = \theta_{off\,boresight} + 360$;

In the course of building or populating a table using data from multiple targets and multiple sweeps, one target might provide say, 20 ΔV values obtained at 20 different azimuth angles. A second target might provide a different set or sets of ΔV values at its corresponding azimuth angles. Third, fourth, fifth, etc. targets might each provide fewer or greater numbers of ΔV values at again different azimuth angles. It is also likely that there will be multiple azimuth angles for a particular value of ΔV. Put another way, for a table with 512 values of ΔV, any particular value of ΔV might be obtained from different OBA. In one embodiment, each OBA entry of a monopulse calibration table is determined as a running average of azimuth angles where each value of ΔV was obtained. The running average $\overline{\theta}(n)_{count}$ of an OBA for a particular value of ΔV can be calculated in one more than one way but in the above-identified embodiment it is calculated using a running average where the new average, is calculated from the last average and the new azimuth input OBA angle $\theta_i$:

$$\overline{\theta}(n)_{Count+1} = \frac{Count * \overline{\theta}(n)_{count} + \theta_i}{Count + 1} \quad (7)$$

where $\overline{\theta}(n)_{Count}$ is a previously-determined arithmetic average of a Count-number of azimuth angles θ, and $\theta_i$ is a new or additional azimuth angle to be added into the average $\overline{\theta}(n)_{count+1}$ value of a Count+1-number of azimuth angles. Thus each of the off bore sight angle averages for each ΔV can be plotted on a graph or left in a table format.

Moreover, the method of building a monopulse calibration table from live targets in one example includes building multiple tables, with each table being for ΔV values and azimuth angles obtained a target at a particular elevation. In one embodiment, five separate monopulse calibration tables were created. Table 0 was for readings obtained from a target or targets at elevation angles from 0 to 10 degrees; Table 1 was for readings obtained at elevation angles of 10 to 20 degrees; Table 2 was for readings obtained at elevation angles from 20 to 30 degrees; Table 3: 30 to 40 degrees; and Table 5: 40 to 50 degrees elevation.

In SSR radar, elevation angle of a target is provided by the Mode C response, which is identified in FIG. 2 by reference numeral 216. When 3-D radar is used, elevation angle can be extracted from the radar height data (identified in FIG. 2 by reference numeral 212) and the range data (identified in FIG. 2 by reference numeral 214).

Once a reported target reaches its end, the strong or high quality signals are evaluated. In one embodiment, if at least three height replies were within 100 feet of each other, the height is determined to be valid with the first height reply being used to determine the target's elevation. If the height data is not valid or non-existent, the target height is set to zero and all of the signals are processed into Table 0. Once target height is known, the target elevation angle relative to the horizon can be calculated as:

$$\theta_{Elev} = ASIN\left(\frac{H_{TARGET} - H_{RADAR}}{Range}\right)$$

The relative elevation to the antenna's boresight elevation $\theta_{ANT\_ELEV}$ is determined as:

$$\theta_{Elev} = \theta_{Elev} - \theta_{ANT\_ELEV} \quad (4)$$

The elevation angle $\theta_{Elev}$ of a target is used to determine which of the elevation-angle monopulse calibration tables to update using the processes described above. After all of the data from a particular target is collected, a particular table can be constructed and updated according to the elevation angle where the data is obtained. A target's azimuth center, $\theta_{boresight}$, is calculated for each table using the equations above. The off boresight angle for each ΔV is also calculated for each table.

Referring again to FIG. 2, at step 228, the normalized received signal values $\Delta V_i$ for each table is the index to the memory, with their corresponding running average OBA to form monopulse calibration tables for different elevations.

Figure 8:
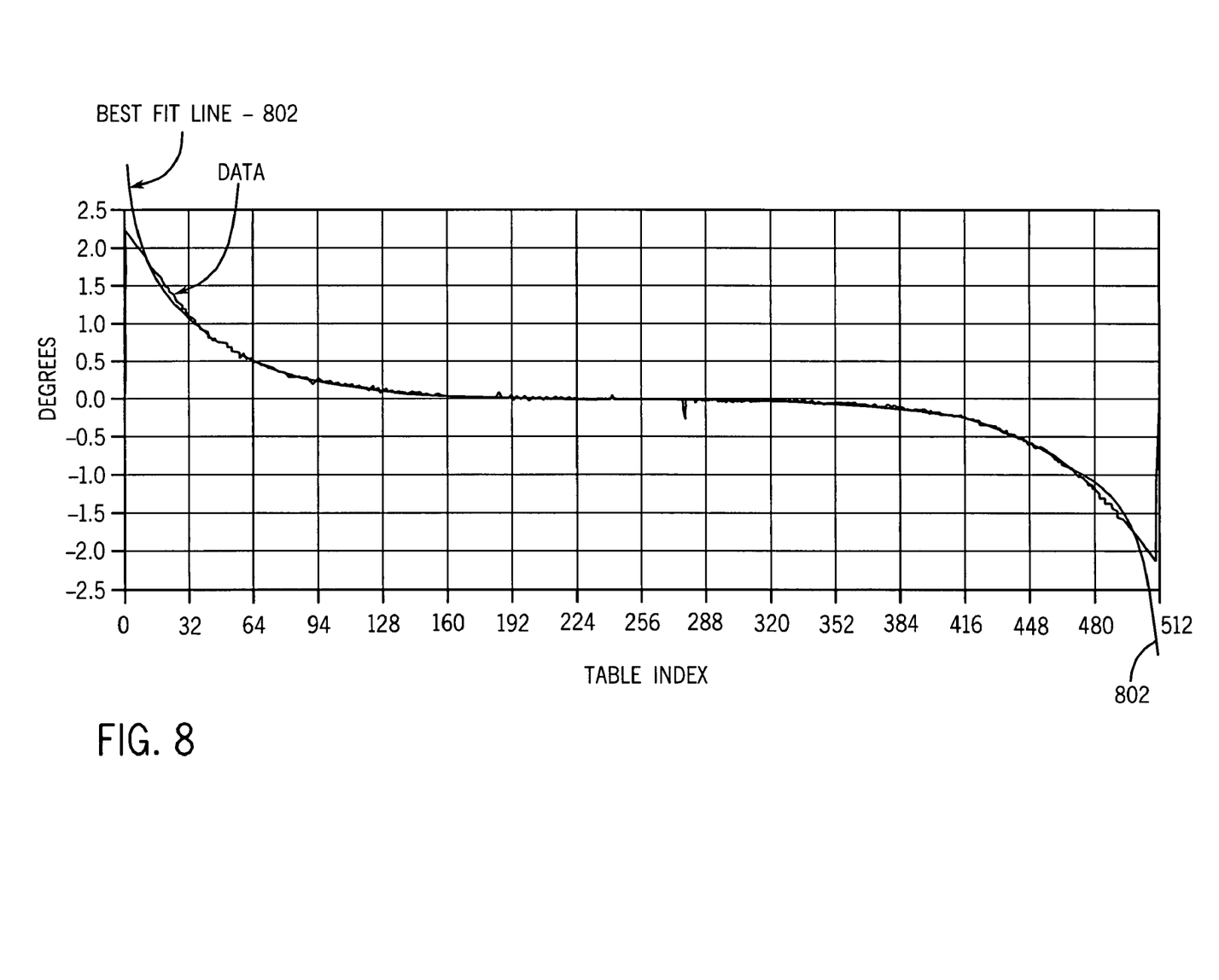
FIG. 8 shows a plot of the data of a monopulse calibration table obtained from live data, and a best-fit line approximation of the live data, derived from the live data.

Referring now to FIG. 8 there is shown a monopulse calibration table, which is constructed by plotting values for ΔV along the horizontal or x-axis with the corresponding off bore sight angle (OBA) running averages plotted on the vertical or y-axis. In constructing the table shown in FIG. 8, before any $\Delta V$ values are stored or plotted, the $\Delta V$ values are first converted to integers. The integer values of $\Delta V$ then become pointers or indices into the calibration tables for the different elevation angles.

The monopulse calibration table thus has a monopulse table index or MonoTableIndex, which is expressed from the monopulse discriminant:

$$\text{MonoDiscriminant} = \text{Log}_2\text{SUM} - \text{Log}_2\text{DIFF} + (\text{float})0.5; \quad (5)$$

where the term (float)0.5 is a value required to be added or subtracted to convert the $\text{Log}_2\text{SUM} - \text{Log}_2\text{DIFF}$ value, to the nearest-value integer. The monopulse calibration table index can then be expressed as:

$$\text{MonoTableIndex} = (\text{int})\text{MonoDiscriminant}. \quad (6)$$

Put another way, the monopulse calibration table index is equal to $\Delta V$, converted to the nearest-valued integer. For each monopulse calibration table index, there will exist a corresponding off boresight angle $\theta$.

As can be seen in FIG. 8, the horizontal axes of the monopulse calibration tables becomes series of integers starting from either zero or 1, up to a user-specified number of $\Delta V$ values which the table will have, when enough data to fill the table has been captured.

A calibration table with a relatively large number of $\Delta V$ values from a large number of azimuth angles will provide greater resolution or accuracy in the determination of a target's off bore sight location than will a calibration table of a relatively small number of $\Delta V$ values obtained from a relatively small number of azimuth angles. In one embodiment, the monopulse calibration table had 512 values for $\Delta V$, corresponding to 512 the SUM and DIFF signals obtained at different azimuth angles where each $\Delta V$ was determined. Half of the $\Delta V$ values, i.e., 256, were made at azimuth angles on each side of the antenna's bore sight. Of the 256 values of $\Delta V$ on each side of the antenna's bore sight there are corresponding average OBA, which in one example are determined using a running average of the OBA.

The size of a monopulse calibration table is a design choice but a large table of say, 512 entries will provide a monopulse calibration table with greater resolution than will a short table of say 20 or 30 entries. The number of entries in the table should be evenly divided on both sides of an antenna's boresight.

In order to construct a monopulse calibration table of a large number of entries, (e.g., 256 entries on each side of the antenna's boresight) $\Delta V$ measurements are needed for each table entry. By way of example, for a table having 512 entries, 512 separate monopulse table indices, with each index corresponding to a $\Delta V$ value, are needed.

FIG. 8 also shows a best-fit line approximation of the live data, derived from the live data using the process described above. The horizontal or x-axis of the graph in FIG. 8 has 512 separate data values numbered from 0 to 511, each of which corresponds to a $\Delta V$ obtained at a corresponding azimuth angle, $\theta$. Two hundred fifty six (256) values are plotted on each side of the antenna's bore sight azimuth angle $\theta$ boresight. The OBA angles $\theta$ where each $\Delta V$ was obtained, are plotted along the y-axis.

Those of ordinary skill in the art will recognize that it might not be possible to obtain 512 valid $\Delta V$ values from 512 different azimuth angles $\theta$ in a single sweep of a single live target. Thus, completion of a relatively long monopulse calibration table can require the accumulation of live data from multiple targets, over multiple scans at perhaps multiple elevation angles (in embodiments where separate tables are prepared for separate elevation angle sectors).

In order to improve accuracy and to fill tables having entries that might not be populated by data obtained during actual measurements, a "best-fit" line can be determined using a second order polynomial. As used herein, the best-fit line is considered to be a line or curve that closely approximates, but which in one example is identical to the shape of the curve plotted through the actual data values of off bore sight angles as a function of $\Delta V$ values.

FIG. 8 shows a best-fit line identified by reference numeral 802, which was derived from the running average of OBA and normalized $\Delta V$. As a first step in calculating a best-fit line, an approximation is performed for the data on each side of the $\theta_{boresight}$. In an embodiment where 512 data points are collected, the approximation is made separately for the 256 data points on each side $\theta_{boresight}$. As shown by reference numeral 230 in FIG. 2, a "best-fit" line in one example is calculated for each separate elevation table.

In order to determine a best fit line, a polynomial approximation table Az(i) is constructed. For an embodiment of 512 data points, Az(i) for i=0 to i<256 is calculated first as:

$$Az(i) = \frac{1}{a_0 + a_1 i + a_2 i^2 + a_3 i^3} \quad (8)$$

Higher indices, e.g., 256 to 511, can use the same process if the function to be approximated is represented in a reverse order. To approximate this function, a direct polynomial combination needs to be established:

$$y_i(i) = a_0 + a_1 i + a_2 i^2 + a_3 i^3 \text{ where} \quad (9)$$

$$y_i(i) = \frac{1}{Az_i(i)} \quad (10)$$

The best-fit line coefficients $a_i$ can be obtained by solving the matrix equation that returns a vector A that contains the best fin line coefficients:

$$[M]\vec{A} = \vec{Y} \quad (11)$$

where $$[M] = \begin{bmatrix} m & \sum_m i & \sum_m i^2 & \sum_m i^3 \\ \sum_m i & \sum_m i^2 & \sum_m i^3 & \sum_m i^4 \\ \sum_m i^2 & \sum_m i^3 & \sum_m i^4 & \sum_m i^5 \\ \sum_m i^3 & \sum_m i^4 & \sum_m i^5 & \sum_m i^6 \end{bmatrix} \quad (12)$$

-continued $$\text{and } \vec{A} = \begin{bmatrix} a_0 \\ a_1 \\ a_2 \\ a_3 \end{bmatrix} \text{ and } \vec{Y} = \begin{bmatrix} \sum_m \frac{1}{Az_i(i)} \\ \sum_m \frac{i}{Az_i(i)} \\ \sum_m \frac{i^2}{Az_i(i)} \\ \sum_m \frac{i^3}{Az_i(i)} \end{bmatrix}$$

The solution for the vector coefficient matrix $\vec{A}$ is given as $\vec{A} = [M]^{-1} \vec{Y}$ where the one-over matrix expression $$M^{-1} = \frac{1}{|M|} adjA$$

and where $|M|$ is the determinant of the square matrix M and adjA is the matrix formed by replacing each element with its cofactor and transposing the result. Once the 256 points best-fit table is calculated by the function, it is loaded back to a 512 array in the proper order.

A best fit line in one example is tested to be valid or invalid. In one embodiment, a best-fit line calculation is considered to be valid for any of the five monopulse tables if a table had at least fifty cells and each cell has at least ten entries. Those of ordinary skill will recognize however that other best-fit line validity criteria could be used in alternate embodiments.

In the above-identified embodiment, if a best-fit line is not valid using the above-identified criteria then the above-identified default table is used for all five elevation tables. If the standard deviation for Table 0 is calculated to be more than a default value of 5, the default table was used for Table 0. If the standard deviation for Table 0 is calculated to be less than or equal to 5, the best-fit line is constructed using a combination of measured data and best-fit line data described above. For tables 1 to 4, if the best-fit line is invalid, or if the best fit line standard deviation is more than 1, the best-fit line for Table 0 is used.

The standard deviation of the best fit line is calculated from the equation:

$$Std = \sqrt{\frac{\sum_N [Fit(i) - Az(i)]^2}{N}} \quad (13)$$

Where
Fit(i)=the fit line points as extracted from the best fit table, described below; and
Az(i)=the measured data points, i.e., the data points derived from actual signals.

A comparison of the calculated best-fit line to actual data shows that the best-fit line provides a good approximation of monopulse calibration data where live target data is noisy. When the data quality is high, however, and when noise is minimal, a small bias error in the best-fit line can be observed at the edges of the actual data. Therefore, a best-fit table should be a linear combination of the best-fit line as calculated above and measured data, as can be seen in FIG. 8. In one embodiment, the best fit line replaces all points where the count of data points is less than a default number of 30 points and the measured data is used elsewhere. The default number of 30 points is a design choice and other values could be used in alternate embodiments. Finally, it should be noted that in embodiments using multiple elevation tables, a best-fit line is calculated as a composite of all the tables, as shown in FIG. 2.

As for an apparatus to perform the method set forth herein, FIG. 1 shows a depiction of a radar system 10. The system 10 is comprised of a rotating antenna 12 that receives signals at SUM 13A and difference 13B antenna channels within an angular-shaped beam 14, the center of which is the antenna's bore-sight 16. The angle formed between a reference direction, such as true north and the bore-sight 16 is the azimuth angle θ, which is also identified by reference numeral 18.

A transmitter/receiver 20 is coupled to the antenna 12 and receives signals from the SUM 13A DIFF 13B channels of the antenna 12, which is known to those of ordinary skill in monopulse radar.

A computer 22 is coupled to the transmitter/receiver 20 and receives data from the receiver, which represents the signals that are received at the SUM 13A and DIFF 13B channels of the antenna 12. Computer program instructions are stored in a memory device 24 coupled to the computer 20 though an address and control bus 25. The memory device 24 can be implemented using any appropriate device, examples of which include static or dynamic RAM, EEPROM, magnetic or optical disk storage devices. A display device 26, such as a CRT or LCD, displays locations of the target 11 for an operator.

When the instructions in the memory device 24 are read by the computer 22 and executed, they cause the computer to perform the steps depicted in the FIGS. 2 and 6 and as described above, thereby providing an apparatus by which a monopulse calibration table can be constructed using live, radar targets of opportunity. More particularly, the program instructions stored in memory cause the computer to read SUM and DIFF signal values from the radar receiver, calculate normalized received values thereof and to identify ΔV maxima, perform center of gravity averaging, building a monopulse calibration table, by calculating the running averages of azimuth angles for monopulse calibration table indices and calculating the best-fit line for each of the tables.

The steps or operations and the apparatus described herein are examples of a method and apparatus by which a monopulse calibration table can be constructed using a live radar target of opportunity. There may be many variations to these steps or operations and variations to the apparatus without departing from the spirit of the invention without departing from the spirit of the invention and these are therefore considered to be within the scope of the invention as defined in the following claims.

What is claimed is:

1. A method of building a monopulse calibration table from a live target of opportunity using signals received from the target at sum and difference antenna channels of a rotating radar antenna that receives signals within an angular-shaped beam, the center of which is the antenna's bore-sight, the angle formed between a reference direction and the bore-sight being an azimuth angle, the method comprising the steps of:
   a) at each of a plurality of N different azimuth angles, calculating a normalized received signal from a target of opportunity using a signal received from the target at a sum channel and using a signal received from the target at a difference channel;

b) identifying the azimuth angle of where the target of opportunity is actually located as the azimuth angle whereat the magnitude of the normalized received signal obtained in step a) is greatest;

c) for each of the other N azimuth angles of step a), calculating the difference between each of the N azimuth angles of step a) and the azimuth angle determined in step b) to obtain N, off-bore sight angles where each of the normalized received signals of step a) was determined;

d) storing each of the normalized received signal obtained at step a) with a corresponding off bore sight azimuth angles determined in step c).

2. The method of step 1 wherein the step of calculating a normalized received signal is comprised of the steps of:
dividing the magnitude of the signal from the sum channel by the magnitude of the signal from the difference channel to obtain a value $\Delta V$.

3. The method of claim 2 wherein the step of identifying the azimuth angle whereat the magnitude of the normalized received signal obtained in step a) is greatest is further comprised of
identifying the azimuth angle where the target center exists by calculating a weighted average of all azimuth angles for all corresponding $\Delta V$ values.

4. The method of step 1 wherein the step of calculating a normalized received signal is comprised of the steps of:
determining a logarithmic value of the magnitude of the signal from the difference channel;
determining a logarithmic value of the magnitude of the signal from the sum channel;
subtracting the logarithmic value of the magnitude of the signal from the difference channel from the logarithmic value of the signal from the sum channel.

5. In a radar system, a method of determining off-bore sight angles of a target using a plurality of signals received from the target at sum and difference antenna channels of a rotating radar antenna at each azimuth angle of a plurality of azimuth angles, the method comprising the steps of:

a) at each azimuth angle $\theta_i$ of a plurality of i azimuth angles, calculating a normalized received signal $\Delta V_i$ for signals that are received at the antenna from a target from a $V_{sum}$ signal and a $V_{diff}$ signal;

b) calculating the target's actual azimuth angle $\theta_{boresight}$ as the sum of the product of all $\theta_i \cdot \Delta V_i$, divided by the sum of all $\Delta V_i$;

c) for each of the i azimuth angles $\theta$, of step a), calculating an off bore sight angle 74 $_{off\ bore\ sight\ i}$ for each corresponding $\Delta V_i$ by calculating the difference between each azimuth angle $\theta_i$, of step a) and the azimuth angle $\theta_{boresight}$ determined in step b) to obtain i, off-bore sight angles, $\theta_{off\ bore\ sight\ i}$, whereat a corresponding $\Delta V_i$ of step a) was determined;

d) correlating each of the normalized received signals $\Delta V_i$ obtained at step a) to a corresponding off-bore sight angle $\theta_{off\ bore\ sight\ angle\ i}$ determined in step c).

6. The method of claim 5 further including the steps of:
converting each value of $\Delta V_i$ to a nearest-valued integer, int($\Delta V_i$).

7. The method of claim 6 further including the steps of:
storing each int($\Delta V_i$) with a corresponding $\theta_{off\ bore\ sight\ angle\ i}$ to determine a target's off bore sight angle.

8. The method of claim 5 wherein the step of calculating a normalized received signal is comprised of the steps of:
dividing the magnitude of the signal from the sum channel $V_{sum}$ by the magnitude of the signal $V_{diff}$ from the difference channel.

9. The method of claim 5 wherein each normalized received signal is determined by the steps of:
determining a logarithmic value of the magnitude of the signal $V_{diff}$ from the difference channel;
determining a logarithmic value of the magnitude of the signal $V_{sum}$ from the sum channel;
determining the difference between the logarithmic value of the magnitude of the signal from the difference channel and the logarithmic value of the signal from the sum channel.

10. The method of claim 5 wherein the step of identifying the azimuth angle whereat the magnitude of the normalized received signal obtained in step a) is greatest is further comprised of the steps of:
storing each of the N azimuth angles whereat a sum and difference signal ratio is determined;
storing each of the N sum and difference signal ratios;
sorting each of the N sum and difference signal ratios to determine the greatest ratio; and
identifying the corresponding azimuth angle where the greatest sum and difference signal ratio occurred.

11. The method of claim 5 further comprising the step of:
calculating a running average of the azimuth angles $\theta$ for each corresponding $\Delta V_i$.

12. The method of claim 11, wherein the running average is calculated by the equation:

$$\overline{\theta}(n)_{Count+1} = \frac{Count * \overline{\theta}(n)_{count} + \theta_i}{Count+1}$$

where $\overline{\theta}(n)_{Count}$ is a previously determined average of a Count-number of azimuth angles $\theta$, and $\theta_i$ is a new azimuth angle to be added to the running average of Count+1-number of azimuth angles.

13. The method of claim 5 further comprising the step of:
assigning a plurality of signals received from the target at sum and difference antenna channels of a rotating radar antenna at a plurality of azimuth angles to a predetermined vertical angle segment.

14. The method of claim 5 further comprising the step of:
determining a best-fit line for a graph of all $\Delta V$ and all $\theta_{off\ bore\ sight}$ angles.

15. In a monopulse radar receiver, a method of building a monopulse calibration table from SUM and DIFF signals received from a plurality of live radar targets, the table having N entries, each of the N entries comprising a monopulse discriminant and comprising a corresponding azimuth angle whereat signals from the live targets are obtained, the method comprising the steps of:
determining a first azimuth angle $\theta$ that corresponds to a first monopulse discriminant, from a first live target;
determining a second azimuth angle $\theta$ that corresponds to the first monopulse discriminant, from the first live target;
calculating a running average of the first and second azimuth angles $\theta$ for the first monopulse discriminant for the first live target.

16. The method of claim 15 further comprising the step of:
identifying an azimuth angle of a second live target from the running average of the azimuth angles for the first monopulse discriminant obtained from azimuth angles obtained from the first live target.

17. The method of claim 15 wherein the running average of azimuth angles is determined by the equation:

$$\overline{\theta}(n)_{Count+1} = \frac{Count * \overline{\theta}(n)_{count} + \theta_i}{Count + 1}$$

where $\overline{\theta}(n)_{Count}$ is a previously determined average of a Count-number of azimuth angles θ, and $\theta_i$ is a new azimuth angle to be added to the running average of Count+1-number of azimuth angles.

18. The method of claim 15 further comprising the step of:
receiving signals from a live radar target that identifies the target's elevation as being within an elevation range.

19. The method of claim 18 further comprising the steps of:
assigning the running average of the first and second azimuth angles θ for the first monopulse discriminant for the first live target to a first range of elevation angles.

20. The method of claim 15 further comprising the step of:
calculating a best-fit line for azimuth angles and normalized received signals.

21. In a monopulse radar receiver, a method of building a monopulse calibration table from signals received from a plurality of live radar targets, the table having N entries, each of the N entries comprising a monopulse discriminant and comprising a corresponding azimuth angle whereat signals from the live targets are obtained, the method comprising the steps of:
determining a first azimuth angle θ that corresponds to a first monopulse discriminant, from a first live target;
determining a second azimuth angle θ that corresponds to the first monopulse discriminant, from a second live target;
calculating a running average of the first and second azimuth angles θ for the first monopulse discriminant obtained from the first and second live targets.

22. The method of claim 21 further comprising the step of:
identifying an azimuth angle of a third live target from the running average of the azimuth angles for the first monopulse discriminant obtained from azimuth angles obtained from the first and second live targets.

23. The method of claim 21 wherein the running average of azimuth angles is determined by the equation:

$$\overline{\theta}(n)_{Count+1} = \frac{Count * \overline{\theta}(n)_{count} + \theta_i}{Count + 1}$$

where $\overline{\theta}(n)_{Count}$ is a previously determined average of a Count-number of azimuth angles θ, and $\theta_i$ is a new azimuth angle to be added to the running average of Count+1-number of azimuth angles.

24. The method of claim 21 further comprising the step of:
receiving signals from a live radar target that identifies the target's elevation as being within an elevation range.

25. The method of claim 21 further comprising the steps of:
assigning the running average of the first and second azimuth angles θ for the first monopulse discriminant for the first live target to a first range of elevation angles.

26. The method of claim 21 further comprising the step of:
calculating a best-fit line for azimuth angles and normalized received signals.

27. A radar system comprised of:
a rotating antenna that receives signals at sum and difference antenna channels from targets at different elevations, within an angular-shaped beam, the center of which is the antenna's bore-sight, the angle formed between a reference direction and the bore-sight being an azimuth angle;
a receiver coupled to the antenna and receiving signals from the sum and difference channels of the antenna in an elevation angle range;
a computer coupled to the receiver and receiving data that represents signals received at the sum and difference channels of the antenna; and
memory, coupled to the computer, said memory storing program instructions, which when executed cause the computer to:
a) calculate a normalized received signal from a target of opportunity in an elevation angle range at each of a plurality of i different azimuth angles θ, using a signal received from the target at the antenna's sum channel and using a signal received from the target at the antenna's difference channel;
b) identify an azimuth angle $\theta_{boresight}$ of where the target of opportunity is actually located, as the azimuth angle whereat the magnitude of the normalized received signal obtained in step a) is greatest;
c) for each of the other i azimuth angles of step a), calculate the difference between each of the i azimuth angles of step a) and the azimuth angle determined in step b) to obtain i, off-bore sight angles where each of the normalized received signals of step a) was determined;
d) correlate each of the normalized received signal obtained at step a) to a corresponding off-bore sight angle determined in step c).

28. The radar system of claim 27, wherein said program instructions cause the computer to:
e) determine a second target's off-bore sight angle by correlating a normalized received signal obtained from the second target, to a normalized received signal value determined for the target of opportunity and an associated off-bore sight angle determined in step d).

29. The radar system of claim 27, wherein said program instructions cause the computer to:
divide the magnitude of the signal from the sum channel by the magnitude of the signal from the difference channel.

30. The radar system of claim 27, wherein said program instructions cause the computer to:
divide the magnitude of the signal from the difference channel by the magnitude of the signal from the sum channel.

31. The radar system of claim 27, wherein said program instructions cause the computer to:
determine a logarithmic value of the magnitude of the signal from the difference channel;
determine a logarithmic value of the magnitude of the signal from the sum channel;
subtract the logarithmic value of the magnitude of the signal from the difference channel from the logarithmic value of the signal from the sum channel.

32. A radar system comprised of:
a rotating antenna that receives signals at sum and difference antenna channels within an angular-shaped beam, the center of which is the antenna's bore-sight, the angle formed between a reference direction and the bore-sight being an azimuth angle;
a receiver coupled to the antenna and receiving signals from the sum and difference channels of the antenna;
a computer coupled to the receiver and receiving data that represents signals received at the sum and difference channels of the antenna; and memory, coupled to the computer, said memory storing program instructions, which when executed cause the computer to:

a) determine at each azimuth angle $\theta_i$ of a plurality of i azimuth angles in an elevation angle range, a normalized received signal $\Delta V_i$ for signals that are received at the antenna from a target in said elevation angle range;

b) calculate a target's actual azimuth angle $\theta_{boresight}$ in the elevation angle range as the sum of the product of all $\theta_i \cdot \Delta V_i$, divided by the sum of all $\Delta V_i$;

c) for each of the i azimuth angles $\theta$ in the elevation angle range of step a), calculate the off bore sight angle $\theta_{off\,bore\,sight}$ of each $\Delta V_i$ by calculating the angle difference between each azimuth angle $\theta_i$, of step a) and the azimuth angle $\theta_{boresight}$ determined in step b) to obtain i, off-bore sight angles, $\theta_{off\,bore\,sight\,i}$, whereat each of the normalized signals $\Delta V_i$ of step a) was determined;

d) correlate each of the normalized received signals $\Delta V_i$ obtained at step a) to a corresponding off-bore sight angle $\theta_{off\,bore\,sight\,i}$ determined in step c).

33. The radar system of claim 32, wherein said program instructions cause the computer to:
determine when the phase angle difference between a signal received at the antenna's sum channel and at the difference channel changes by 180 degrees.

34. The radar system of claim 32, wherein said program instructions cause the computer to calculate a normalized received signal $\Delta V_i$ by:
dividing the magnitude of the signal $V_{sum}$ from the antenna's sum channel by the magnitude of the signal $V_{diff}$ from the antenna's difference channel.

35. The radar system of claim 32, wherein said program instructions cause the computer to:
divide the magnitude of the signal from the difference channel $V_{diff}$ by the magnitude of the signal $V_{sum}$ from the sum channel.

36. The radar system of claim 32, wherein said program instructions cause the computer to:
calculate a logarithmic value of the magnitude of the signal $V_{diff}$ from the difference channel;
calculate a logarithmic value of the magnitude of the signal $V_{sum}$ from the sum channel;
calculate the difference between the logarithmic value of the magnitude of the signal from the difference channel and the logarithmic value of the signal from the sum channel.

37. The radar system of claim 32, wherein said program instructions cause the computer to identify the azimuth angle whereat the magnitude of the normalized received signal obtained in step a) is greatest by:
storing each of the N azimuth angles whereat a sum and difference signal ratio is determined;
storing each of the N sum and difference signal ratios;
sorting each of the N sum and difference signal ratios to determine the greatest ratio; and
identifying the corresponding azimuth angle where the greatest sum and difference signal ratio occurred.

38. In a monopulse radar receiver, a method of building a plurality of monopulse calibration tables from signals received from a plurality of live radar targets at a plurality of different elevation ranges, each of the plurality of monopulse calibration tables determining the off bore sight angle location of targets within a corresponding elevation range, each of the tables having N entries, each of the N entries comprising a monopulse discriminant and comprising a corresponding azimuth angle whereat signals from the live targets are obtained, the method comprising the steps of:
receiving a first signal that identifies a first live radar target as being within a first elevation range;
determining a first azimuth angle $\theta$ that corresponds to a first monopulse discriminant, for the first live target;
receiving a second signal that identifies a second live radar target as being within said first elevation range;
determining a second azimuth angle $\theta$ that corresponds to the first monopulse discriminant, for the second live target;
calculating a running average of the first and second azimuth angles $\theta$ for the first monopulse discriminant obtained from the first and second live targets within said first elevation range;
assigning the running average of the first and second azimuth angles $\theta$ for the first monopulse discriminant to a first monopulse calibration table for live targets within said first elevation range.

39. The method of claim 38 further comprising the steps of:
receiving a third signal that identifies a third live radar target as being within a second elevation range;
determining a third azimuth angle $\theta$ that corresponds to a first monopulse discriminant, from the third live target;
receiving a fourth signal that identifies a fourth live radar target as being within said second elevation range;
determining a fourth azimuth angle $\theta$ that corresponds to the first monopulse discriminant, from the fourth live target;
calculating a running average of the third and fourth azimuth angles $\theta$ for the first monopulse discriminant obtained from the third and fourth live targets within said second elevation range;
assigning the running average of the third and fourth azimuth angles $\theta$ for the first monopulse discriminant to a second monopulse calibration table for live targets within said second elevation range.

40. The method of claim 38 wherein said first signal is an IFF Mode C response.

41. The method of claim 38 wherein said radar is a 3-D radar and said first signal identifies a target's range and horizontal distance and the target's elevation is calculated by the equation:

$$\theta_{Elev} = ASIN\left(\frac{H_{TARGET} - H_{RADAR}}{\text{Range}}\right).$$

42. The method of claim 38, wherein each of the calibration tables corresponds to a range of target elevation angles.

43. The method of claim 42 where the number of calibration tables is five.

44. The method of claim 38 further comprising the steps of: determining an equation for a best fit line for each of the calibration tables.

45. The method of claim 44 further comprising the step of building a monopulse calibration table for live targets using the best fit line for the first monopulse calibration table and the monopulse discriminates and azimuth angles obtained from the first and second live targets.

46. The method of claim 45 further comprising the step of building a monopulse calibration table for live targets using both the best fit lines for the first and second monopulse calibration tables and the monopulse discriminates and azimuth angles obtained from the first, second, third and fourth live targets.

47. The method of claim 44 further comprising the steps of determining whether the best fit line is valid or invalid.

48. The method of claim 47 wherein the determination of a best fit line's validity is determined by calculating a standard deviation of fit line points and measured data points.

* * * * *